June 28, 1966  G. K. C. HARDESTY  3,257,748

ILLUMINATION SYSTEMS WITH INTEGRAL DIMMING

Original Filed Dec. 7, 1960

INVENTOR.
G. K. C. HARDESTY

BY

ATTY

United States Patent Office 3,257,748
Patented June 28, 1966

3,257,748
ILLUMINATION SYSTEMS WITH INTEGRAL DIMMING
George K. C. Hardesty, Box 156, Mayo, Md.
Original application Dec. 7, 1960, Ser. No. 74,438. Divided and this application Sept. 30, 1964, Ser. No. 413,668
3 Claims. (Cl. 40—130)

The invention described herein may be manufactured and used by or for the Government of the United States of America for governmental purposes without the payment of any royalties thereon or therefor.

The present application is a divisional application of applicant's co-pending application Serial No. 74,438, filed December 7, 1960.

The present invention relates to panel illumination and more particularly to the illumination of control console indicators under conditions running from near or total darkness to high ambient illumination.

Many critical equipment failures or other emergency conditions can result from the complexities of modern aircraft, shipboard, and missile control equipment. To protect the ship or aircraft or missile and the personnel who must work around it continuous monitoring and alarm systems have been progressively developed. Several types of these monitoring and alarm systems employ audible signals to attract attention of personnel but in some instances there is difficulty in providing distinctively different audible sgnals for each of the monitors. In other instances, as in the submarine, audible signals must be silent for long periods and reliance placed on silent warning signals. Available visual signals however, do not cover the necessary range of application needs. There is little available to the ship or aircraft designer between the "pilot" or "indicator light" and the large rotating flashing signals of the familiar police squad car or ambulance. Conspicuous, attention demanding, legend displays, which are compact and inexpensive, are needed to provide many shipboard and shore installations with adequate monitor warning signal systems.

Many types of indicator lights and panel illumination devices have been suggested for use on control consoles. The failure of many existing indicator displays to be discernible in high ambient illumination has been the cause of much concern in both shipboard and aircraft situations. When a number of conventional indicator lights are grouped together, the total array is too bright for comfort for near-dark adaptation viewing. Further, the full significance of the light being energized is often a matter of training and memory because it has not been possible heretofore to read the legends on nearby nameplates with prevalent ambient illumination. Some dim-out cap assemblies utilize back-lighted, stencilled, legend discs but their use entails a sharp reduction of maximum brightness that depreciates the effectiveness of the signal, particularly in the higher ambient illumination now prevalent in new submarine construction. Translucent signal panels have in the past been rear illuminated by lamps placed behind the panel. However, such attempts at rear illumination invariably have resulted in uneven ineffective illumination if the lamps are placed close to the rear panels, or vastly reduced brightness if the lamps are sufficiently removed from the panels to result in reasonably uniform brightness. It should also be noted that in some instances, sufficient space is not available behind the console panel for removal of these lamps in case of lamp failure.

The present invention permits efficient presentation of displays which are particularly suitable for use in high ambient illumination conditions. The underlying optical system is capable of use with various types of illumination sources with greater efficiency in both power and space than was possible with most prior art devices. The illumination provided by this invention achieves uniform high brightness displays that are suitable for use in control and monitoring applications where the uneven, ineffective displays which were prevalent in many prior art devices are virtually useless. These advantages are provided basically by a closed-loop or reentrant optical circuit wherein the light source is shielded from the indicia to be illuminated by an opaque barrier. In accordance with the invention, light from the light source is carried around the opaque shield, in accordance with the laws of total internal reflection, by a transparent light transmitting element.

Accordingly, it is an object of the present invention to provide an improved illuminated signal device adequate for use under conditions of high ambient illumination as well as under conditions of near or total darkness.

Another object is the provision of a system for effecting local zones of rear illumination in translucent signal panels with the result that uniform brightness symbols on the panels may be selectively illuminated in accordance with the needs of a monitoring or control equipment.

A further object of the invention is to provide a small illuminated-legend indicating module capable of presenting information without the need for auxiliary name plate interpretation.

Still another object is the provision of a legend display which will be conspicuous, attention demanding, compact, inexpensive, and optionally capable of presenting the displayed information in a series of coded colors.

Other objects and many of the attendant advantages of this invention will be readily appreciated as the same becomes better understood by reference to the following detailed description when considered in connection with the accompanying drawings wherein.

Figure 1:
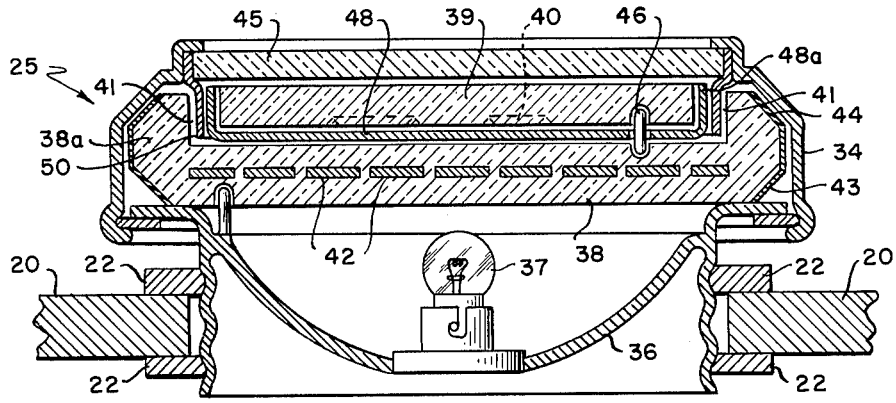
FIG. 1 is a sectional view of one embodiment of the present invention.

In the form of the invention illustrated in FIG. 1, there is provided a signalling assembly, generally indicated at 25, wherein the lamp is mounted external to the reflex structure and a mechanical dimming means provided. The assembly 25 comprises a circular housing and light shield 34 which is mounted onto console panel 20 by means of a mounting and reflector element 36. Carried by reflector element 36 is an outwardly facing lamp source 37 which is designed to supply light flux to light input panel 38, which in turn is again designed to transmit the light to an edge lighted display panel 58 having indicia 50 thereon. The display panel 39 is recessed into one side of the light input panel as illustrated in FIG. 1, and an air gap 41 is defined between the edge of the display panel and the surrounding portion 38a of the light input panel. Embedded in light input element 38 is a light diffusing lattice 42 which is designed to reflect light received from source 37 through light input element 38 between the polished surfaces thereof. The outer edges of the light input panel 38 are beveled to provide light reflecting facets 43, 44. The panels 38, 39 cooperate to provide a light conducting circuit whereby light injected into panel 38 by the lamp 37 and diffused by lattice 42 is reflected by the facets 43, 44 across the air gap 41 and into the panel 39 for illumination of the indicia 40. A portion of the light transversing the panel 39 re-crosses the air gap 41 from the panel 39 and reenters panel 38 for internal reflection by the facets 43, 44 and subsequent recirculation through the panel 39, thereby enhancing the illumination of the indicia 40. If desired, a colored viewing window 45 may be provided in front of the edge lighted display elements 39. Rigidly attached by means of a locking dowel 46 between light input element 38 and edge lighted display element 39 is an opaque barrier 48 having a castellated, cylindrical portion 48a extending into the air gap 41 and forming part of a mechanical dimmer or light valve. The enclosing housing and light shield 34 in this embodiment is mounted for rotation around the light input element 38 and edge lighted display element 39. Fixedly attached to enclosing housing and light shield 34 is a castellated extension 50 which is designed to cooperate with the castellated cylindrical portion of the opaque barrier 48, whereby when the housing 50 is rotated, the light coupling between light input element 38 and edge lighted indicia element 39 is varied to dim or brighten the illumination of indicia 40. It should be further understood that by means not shown the mechanical light valve may be electro-magnetically, pneumatically, or otherwise operated in response to a remote control element.

Figure 2:
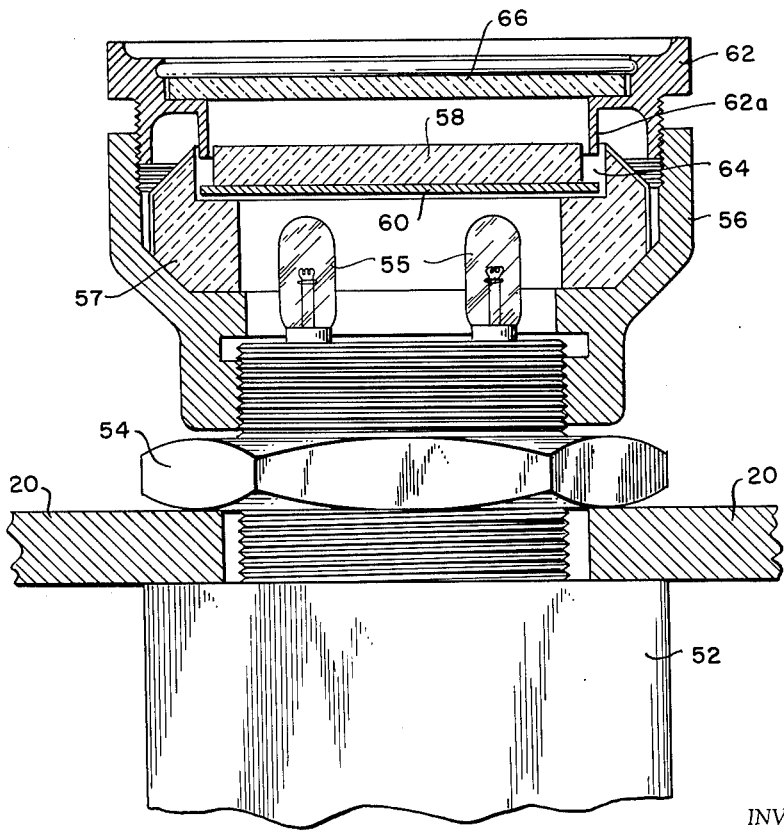
FIG. 2 is a sectional view of another embodiment of the invention.

Referring now to FIG. 2 there is shown a standard Navy switchboard indicator light adapted for use with the present invention. Whereas formerly two lamps were housed in a colored plastic globe and were viewed directly in a signaling function the significance of which had to be explained by separate nomenclature plates, these two functions have now been combined in this embodiment. Thus, in FIG. 2 there is shown a transformer containing a lamp mounting element 52 secured to switchboard panel 20 by means of a lock nut 54 and adapted to supply power to a pair of light sources 55. An enclosing housing and light shield 56 is threaded to an extension of lamp mounting element 52 and contains a toroidal light input element 57 which has beveled peripheral edges as shown, and is mounted in cooperating relationship with a display element 58. A reflective coating is provided on the beveled portions of element 57 and an opaque light barrier 60 is provided to prevent direct illumination of edgelighted display elements 58 by lamps 55. A rotatable dimming ring 62 having an externally threaded portion adapted to engage the internal threaded portion of enclosing housing and light shield 56 has a cylindrically shaped curtain 62a adapted to be interposed in an air gap 64 defined between light input element 57 and edge lighted display element 58 to thereby selectively limit the amount of light flux transmitted between those two elements. Thus it will be seen that by rotating dimming ring 62 in one direction or another and thereby lowering or raising the cylindrical curtain 62a, the brightness of the illumination as seen through viewing window 66 may be varied or the illumination entirely withheld. In common with the light-valving dimming means previously described, this curtain element can be adapted to respond to the commands of a remote element as communicated by pneumatic, electrical or hydraulic transmission systems.

It will be realized by those skilled in the art that many variations of the above-described embodiments are possible. As examples, the shape of the light input elements and display elements may be varied somewhat without departing from the scope of the invention. A color filter may be selectively positioned within the light gap by a suitable linkage or transducer element to effect a change in the color of the display in response to a remote control element. The type of light source used may be varied to suit the needs of the designer, and the techniques of utilizing the invention may be applied to other types of illuminated panels. The same techniques may be utilized in illuminating push button type control switches.

Obviously many other modifications and variations of the present invention are possible in the light of the above teachings. It is therefore to be understood that within the scope of the appended claims the invention may be practiced otherwise than as specifically described.

I claim:
1. An indicator illumination system comprising a light source, indicia to be illuminated, an opaque light shield interposed between said light source and said indicia to prohibit direct lighting of said indicia by said light source, a reentrant light conducting circuit extending from said light source to said indicia whereby light entering said circuit from said light source is conducted through said circuit to illuminate said indicia and is recirculated through said circuit to enhance the illumination, said reentrant light conducting circuit comprising a first light conducting panel into which light from said light source is injected and a second light conducting panel for carrying illumination to said indicia and cooperating with said first light conducting panel to receive light therefrom, one of said light conducting panels having light reflective facets adapted to carry light around said opaque light shield, said first and second light conducting panels defining therebetween an air gap in said light conducting circuit, and mechanical dimming means in said air gap for controlling the amount of light crossing said air gap.

2. An indicator illumination system as defined in claim 1 and wherein said mechanical dimming means comprises:
   first and second annular castellated elements coaxially disposed in said air gap; and
   one of said castellated elements being rotatable with respect to the other castellated element, whereby said castellated elements are cooperable to control light crossing said air gap.

3. An indicator illumination system as defined in claim 1 and wherein said mechanical dimming means comprises:
   a cylindrical curtain disposed in said air gap; and
   said cylindrical curtain being axially movable within said air gap to control light crossing said air gap.

References Cited by the Examiner

UNITED STATES PATENTS

| | | | |
|---|---|---|---|
| 1,963,289 | 6/1934 | Brehm | 240—2.1 X |
| 2,693,656 | 11/1954 | Neugass | 40—130 |
| 2,906,048 | 9/1959 | Kraus | 40—130 X |
| 2,916,011 | 12/1959 | Molis | 116—129 |
| 2,953,668 | 9/1960 | Bassett | 240—1 |
| 3,016,454 | 1/1962 | Simms | 240—46.03 |

FOREIGN PATENTS

| | | |
|---|---|---|
| 816,795 | 5/1937 | France. |
| 1,135,045 | 12/1956 | France. |
| 402,825 | 12/1933 | Great Britain. |
| 499,412 | 1/1939 | Great Britain. |
| 799,783 | 8/1958 | Great Britain. |

WALTER A. SCHEEL, *Primary Examiner.*
IRVING BUNEVICH, *Examiner.*
CLYDE I. COUGHENOUR, *Assistant Examiner.*